(12) United States Patent　　(10) Patent No.:　　US 6,223,456 B1
Hawkins　　(45) Date of Patent:　　May 1, 2001

(54) TURF AERATOR FOOTWEAR ATTACHMENT

(76) Inventor: Melanie Ann Hawkins, 315 Horton Ave., Akron, OH (US) 44312

( * ) Notice: Subject to any disclaimer, the term of this patent is extended or adjusted under 35 U.S.C. 154(b) by 0 days.

(21) Appl. No.: 09/444,092

(22) Filed: Nov. 22, 1999

(51) Int. Cl.$^7$ ........................................................ A43B 3/00
(52) U.S. Cl. .................... 36/113; 36/136; 36/7.6; 172/22
(58) Field of Search .............................. 36/113, 135, 136, 36/7.8, 7.7, 7.6, 61; 172/22, 370, 21

(56) References Cited

U.S. PATENT DOCUMENTS

| | | |
|---|---|---|
| 2,030,770 * | 2/1936 | Smith . |
| 2,057,142 * | 10/1936 | Fry . |
| 2,710,460 * | 6/1955 | Stasinos . |
| 2,714,768 | 8/1955 | Badler . |
| 2,779,262 | 1/1957 | Furr et al. . |
| 2,910,127 * | 10/1959 | Saunders . |
| 2,968,878 | 1/1961 | King . |
| 3,210,112 * | 10/1965 | Glynn . |
| 3,520,075 | 7/1970 | Mullikin . |
| 3,875,688 * | 4/1975 | McNaughton . |
| 3,883,963 * | 5/1975 | Barbite, Sr. . |
| 4,035,935 | 7/1977 | Forrest . |
| 4,693,022 | 9/1987 | Terhune . |
| 5,555,943 * | 9/1996 | Blasczyk . |
| 5,600,901 | 2/1997 | Leonor . |
| 5,661,915 | 9/1997 | Smith . |
| 5,768,809 | 6/1998 | Savoie . |
| 6,003,612 * | 12/1999 | Knight et al. . |
| 6,079,127 * | 6/2000 | Nishimura et al. . |

* cited by examiner

*Primary Examiner*—Ted Kavanaugh
(74) *Attorney, Agent, or Firm*—John D. Gugliotta

(57) ABSTRACT

A device that aids in the aeration of a lawn is provided that attaches to the bottom of ones shoes and provides for core aeration while performing other yard care tasks. A metal plate which is adjustable for various size shoes is provided with attachment straps for attachment to conventional outdoor footwear. Steel tubes approximately 2 inches long will protrude from the bottom of the plates, and are spring biased against the bottom plate such that the soil core is ejected during the natural stride of the wearer.

3 Claims, 3 Drawing Sheets

TURF AERATOR FOOTWEAR ATTACHMENT

RELATED APPLICATIONS

The present invention was first described in Disclosure Document Registration Number 454,355, filed on Apr. 12, 1999. There are no previously filed, nor any copending applications anywhere in the world.

BACKGROUND OF THE INVENTION

1. Field of the Invention

The present invention relates generally to turf core aerator tools and, more particularly, to a turf aerator footwear attachment including a plurality of ground aerating devices with spring loaded aeration tubes.

2. Description of the Related Art

Among the many tasks that one can partake in order to enhance the growth and beauty of one's lawn, garden and landscaping, aeration in combination with watering and fertilizing is among the most popular. However, the time and money associated with conventional aeration techniques prevent many from enjoying its benefits. Accordingly, there is a need for a device that will perform the aeration task with little or no financial or time impact.

A search of the prior art did not disclose any patents that read directly on the claims of the instant invention; however, the following references were considered related.

U.S. Pat. No. 4,693,022 issued in the name of Terhune, U.S. Pat. No. 4,035,935 issued in the name of Forrest, and U.S. Pat. No. 2,729,262 issued in the name of Furr et al. each disclose garden tool attachments for footgear.

U.S. Pat. No. 5,768,809 issued in the name of Savoie, U.S. Pat. No. 5,661,915 issued in the name of Smith, U.S. Pat. No. 5,600,901 issued in the name of Leonor, and U.S. Pat. No. 3,520,075 issued in the name of Mullikin each describe detachable spike attachments for a shoe.

U.S. Pat. No. 2,968,878 issued in the name of King discloses an anti-slip device for footgear.

U.S. Pat. No. 2,714,768 issued in the name of Badler describes ground-aerating sandals.

While several features exhibited within these references are incorporated into this invention, in combination and with other elements the present invention is different enough as to make the combination distinguished over the prior art.

SUMMARY OF THE INVENTION

It is therefore an object of the present invention to provide an improved turf aerator device.

It is a feature of the present invention to provide an improved turf aerator device that is easily attached or removed to the sole of any standard article of footwear in order to provide the described benefits.

Briefly described according to the preferred embodiment of the present invention an apparatus that aids in the aeration of a lawn is provided that attaches to the bottom of ones shoes and provides for core aeration while performing other yard care tasks. A metal plate which is adjustable for various size shoes is provided with attachment straps for attachment to conventional outdoor footwear. Steel tubes approximately 2 inches long will protrude from the bottom of the plates. As a wearer walks along, the tubes will core out a section of earth to allow for increased growth and better fertilizer and water absorption. As the wearer lifts his or her foot, ejection springs inside of each tube will eject the small earth core where it will fall to the surface of the lawn. It will then break down naturally and be reabsorbed by the lawn. If the invention is worn and used while the lawn is being cut, the entire surface of the lawn will receive beneficial aeration.

An advantage of the use of the use of the present invention is that it provides for a healthier lawn without the expense or time associated with conventional aeration tools or machine, and particularly, provides beneficial turf aeration for better infiltration of fertilizer and water.

Another advantage of the present invention is that it is easy to use and adaptable to most articles of conventional footwear, thereby allowing turf aeration to be performed while other tasks are being done such as grass cutting or fertilizing Further, the aeration tubes of the present invention are equipped with spring ejectors to remove earth plugs when foot is lifted.

Further, a preferred embodiment of the present invention provides an adaptable gripping means for increasing friction between the bottom of the foot and the ground.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
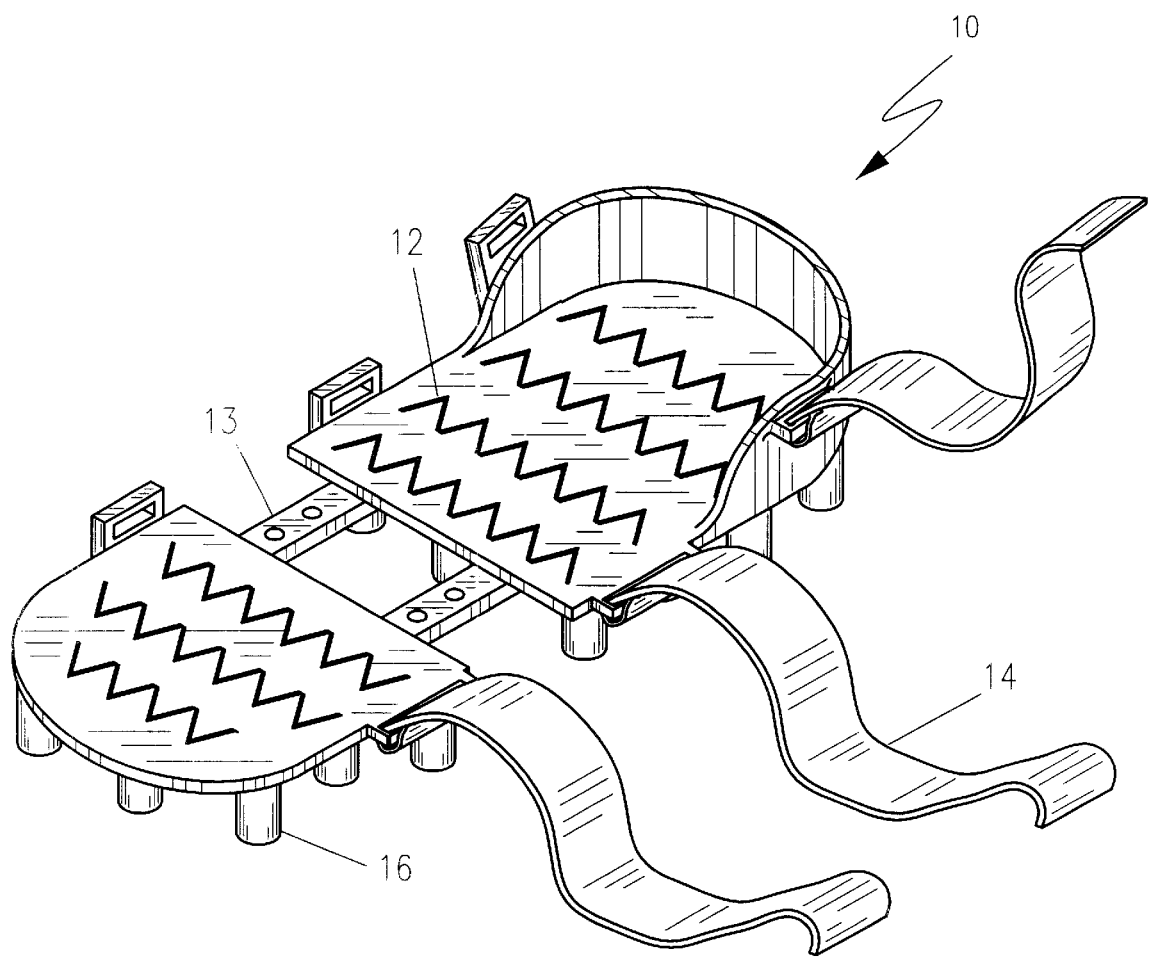
FIG. 1 is a perspective view of a turf aerator footwear attachment according to the preferred embodiment of the present invention.
Figure 2:
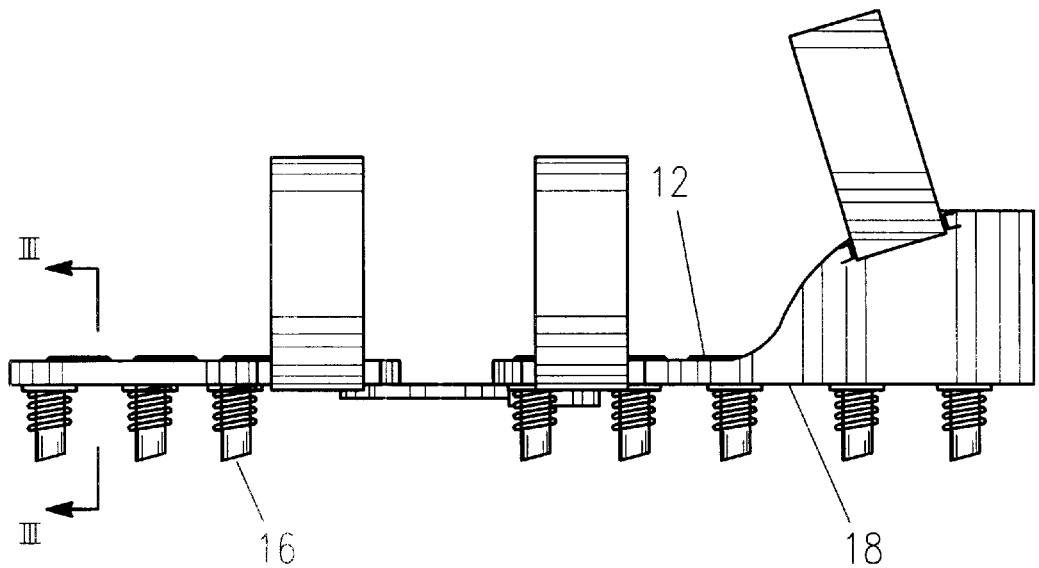
FIG. 2 is a side elevational view thereof.

The best mode for carrying out the invention is presented in terms of its preferred embodiment, herein depicted within the Figures. A turf aerator footwear attachment, generally noted as 10, is shown as an apparatus that aids in the aeration of a lawn is provided that attaches to the bottom of ones shoes 50 and provides for core aeration while performing other yard care tasks. A sole plate 12 which is adjustable for various size shoes is provided with attachment straps 14 for attachment to conventional outdoor footwear 50. Although many methods of varying the size of the sole plate 12 to adjust to different shoes, for purposes of disclosure of the best mode it is anticipated that a front sole element 12a and a rear sole element 12b are linearly aligned and are each affixed to a different end of a slotted retaining plate 13. Although other methods are anticipated, this will allow the device to be resized for different shoes and boots. Also, a plurality of hollow, linearly elongated aeration tubes 16, each approximately 2 inches long will protrude from the bottom 18 of the sole plate 12.

Figure 3:
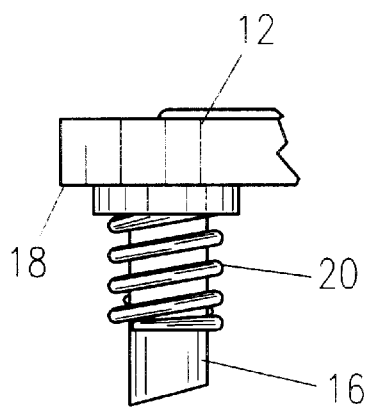
FIG. 3 is a partial detailed elevational view of an aeration tube utilized with the present invention, the view shown being a detail of the section taken along lines III—III of FIG. 2.
Figure 4:
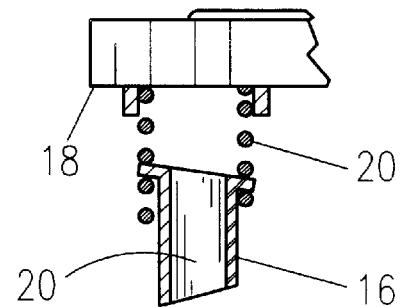
FIG. 4 is a cross sectional elevational view of FIG. 3.
Figure 5:
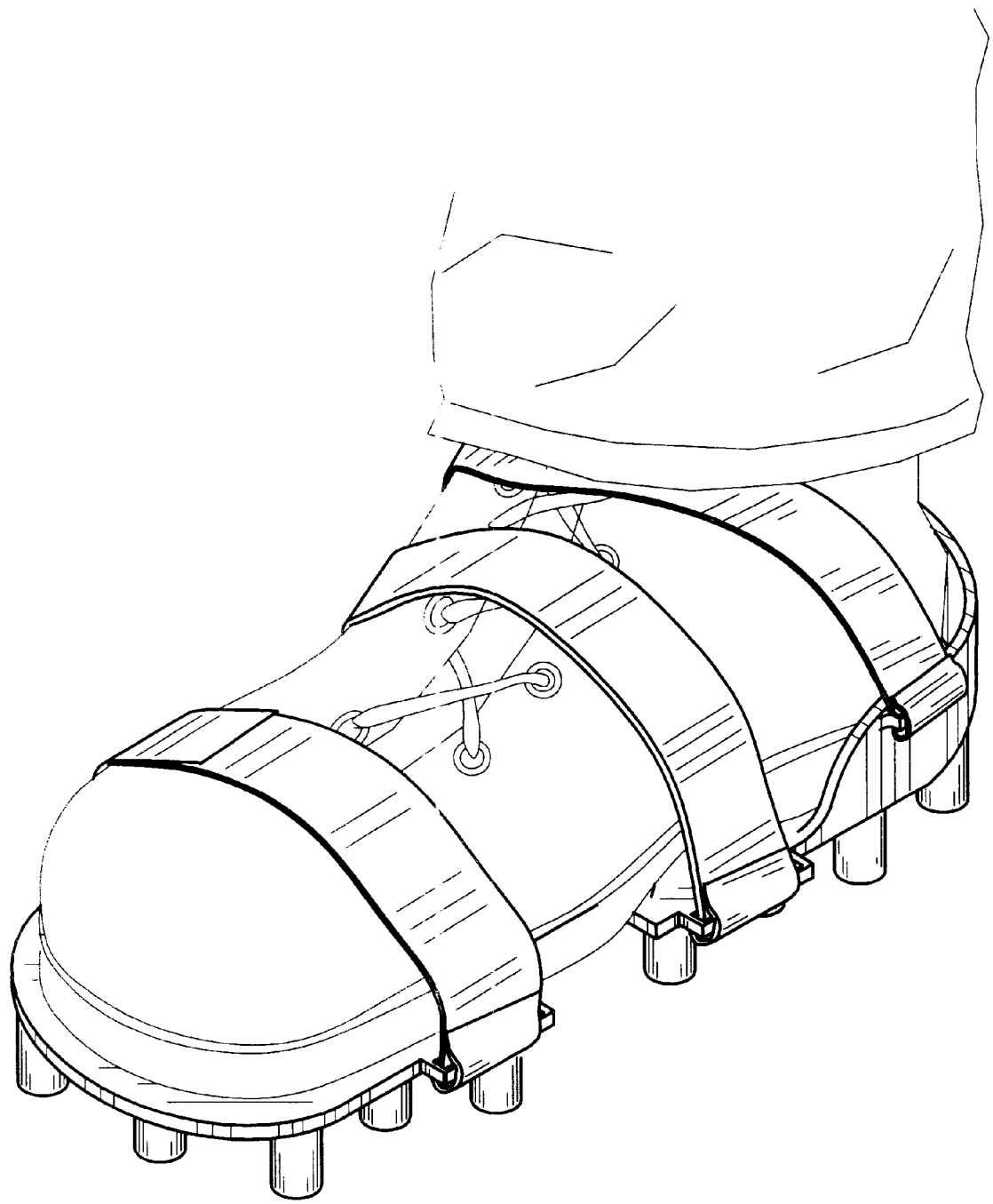
FIG. 5 is a perspective view of the present invention shown in use attached to a conventional piece of footwear.

In further detail as shown in FIG. 3–FIG. 4, each aeration tube 16 is mounted to a linear spring element 20. The spring element 20 is subsequently attached to the bottom surface 18 of the sole plate 12. In this manner, each aeration tube 16 is spring biased to and urged away from the sole plate 12, so that in using the present invention, as a wearer walks along, the tubes will core out a section of earth to allow for increased growth and better fertilizer and water absorption. As the wearer lifts his or her foot, ejection springs inside of each tube will eject the small earth core where it will fall to the surface of the lawn. It will then break down naturally and be reabsorbed by the lawn. If the invention is worn and used while the lawn is being cut, the entire surface of the lawn will receive beneficial aeration.

Additional structural elements include each aeration tube 16 forming a hollow central core, and having an attachment end opposite a turf insertion end. It is anticipated that the turf insertion end would be formed at an acute angle to the general horizontal plane of the turf surface, thereby allowing the aeration tube 16 to leverage into the turf itself.

The foregoing description is included to illustrate the operation of the preferred embodiment and is not meant to limit the scope of the invention. The scope of the invention is to be limited only by the following claims.

What is claimed is:

1. A turf aerator footwear attachment comprising:

a sole plate having an upper surface and a lower surface;

attachment straps affixed to said sole plate, said attachment straps for attachment of said sole plate to a conventional outdoor footwear; and a plurality of hollow, linearly elongated aeration tubes, each said tube approximately 2 inches long and affixed to and protrude from the lower surface of said sole plate, wherein each aeration tube forms a hollow central core and has an attachment end opposite a turf insertion end, said turf insertion end being formed at an acute angle to the general horizontal plane of a turf surface.

2. The turf aerator footwear attachment of claim 1, wherein said sole plate is further comprised of a front sole element and a rear sole element, each said sole element linearly aligned with each other and each affixed to a different end of a pair of slotted retaining plates, and whereby said sole plate is thereby capable of being linearly resized for use with different shoes and boots.

3. The turf aerator footwear attachment of claim 1, wherein each aeration tube is mounted to a linear spring element to said attachment end offset from said lower surface such as to form a discharge orifice, said spring element attached to the bottom surface of the sole plate such that each aeration tube is spring biased to and urged away from the sole plate.

* * * * *